United States Patent [19]

Gutbier

[11] 3,808,434

[45] Apr. 30, 1974

[54] METHOD OF DETECTING FLAWS IN PLATED-THROUGH-HOLES OF CIRCUIT MODULES USING ULTRAVIOLET LIGHT

[75] Inventor: Ernst A. Gutbier, Atkinson, N.H.

[73] Assignee: Western Electric Company, Incorporated, New York, N.Y.

[22] Filed: Dec. 16, 1971

[21] Appl. No.: 208,814

[52] U.S. Cl. .................................................. 250/302
[51] Int. Cl. .................................................. G01b 9/08
[58] Field of Search ................. 250/71 R, 71 T, 302

[56] References Cited

UNITED STATES PATENTS

| | | | |
|---|---|---|---|
| 3,386,920 | 6/1968 | Alburger | 250/302 |
| 3,184,596 | 5/1965 | Alburger | 250/71 T |
| 3,617,744 | 11/1971 | Irish | 250/71 R |

*Primary Examiner*—James W. Lawrence
*Assistant Examiner*—Davis L. Willis
*Attorney, Agent, or Firm*—W. L. Williamson; D. W. Marks; D. J. Kirk

[57] ABSTRACT

A circuit module has copper sheets or conductors bonded to opposite sides of a fluorescent insulating sheet with metal plated-through-holes connecting conductors on opposite sides of the insulating sheet. Ultraviolet radiation is impinged on a first side of the module while it is observed by an operator from an angle of 5° to 90° on the other side of the module. Any flaw in plating of the plated-through-holes exposes the insulating material in the holes resulting in the emission of visible light which can be readily observed. A mask may be placed over etched areas of the circuit module to prevent light being emitted by the etched areas. Also, ultraviolet radiation may be impinged upon circuit patterns which are masked to sense any irregularity or flaw in those circuit patterns.

4 Claims, 11 Drawing Figures

METHOD OF DETECTING FLAWS IN PLATED-THROUGH-HOLES OF CIRCUIT MODULES USING ULTRAVIOLET LIGHT

BACKGROUND OF THE INVENTION

1. Field of the Invention

In the manufacture of double-sided circuit modules or units, conductors are formed on both sides of an insulating sheet. Often, conductors on opposite sides of the insulating sheet must be electrically connected. In one process, holes are formed through the modules and the surfaces of the holes are plated with a metal to connect circuit patterns on opposite sides of the module. These connections are referred to as plated-through-holes. Sometimes, the holes do not plate properly and a circuit connection is not made or is inferior. It is necessary to check the plated-through-hole connections in order to determine if the plating process is properly operating or if a circuit module has all proper connections thereon.

2. Prior Art

Many inspection techniques have been used for monitoring plated-through-hole manufacturing operations. One such technique, used on a sampling basis, is to cut the circuit module and examine the plating thickness and the microstructure of the material under a microscope. This method is time consuming, and since it is a destructive test, it cannot be used to examine all circuit modules.

Another prior art inspection technique involves visually examining the holes under visible light. The operator observes the color and the reflectivity of light from the hole and determines whether the hole has been plated. However, in circuit modules having a large number of holes and for large numbers of circuit patterns, the reliability of such a testing procedure is poor. Also, the testing procedure is extremely tedious to an operator.

U.S. Pat. No. 3,617,744 issued to Carlton Dean Irish on Nov. 2, 1971, describes techniques for testing metal circuitry formed on a surface of an insulating substrate. In particular, the substrate contains a fluorescent material which produces visible light when irradiated with ultraviolet radiation. A shadow image formed by the circuitry is compared with the image on a standard to detect flaws in the circuit pattern.

Ultraviolet inspection techniques have also been used where a fluorescent penetrating material is applied to a surface of an article. In one technique, the fluorescent material is removed from the surface leaving any fluorescent material which may have penetrated into a crack in the surface. Ultraviolet radiation readily reveals the crack. Another technique checks for leaks through to the opposite surface of the article by irradiating the opposite surface of the article with ultraviolet radiation to detect any fluorescent material which may have leaked through.

SUMMARY OF THE INVENTION

An object of the present invention is a new and improved process for inspecting plated-through-hole connections of a circuit module.

Another object of the invention is to utilize ultraviolet irradiation of fluorescent insulating material to inspect through plated-through-hole connections of circuit modules.

In accordance with these and other objects of the invention, a process of inspecting plated-through-hole connections of a double-sided circuit module utilizes a substrate or insulating sheet having fluorescent material incorporated therein. Any absence of metal on the plated surfaces of the through-holes is detected by irradiating the module on a first side with ultraviolet radiation and sensing any visible light emanating from the second side of the module. Further, any areas of the insulating layer which are exposed may be masked to prevent the emission of visible light therefrom. In addition, circuit patterns formed on the second surface of the module may be irradiated by ultraviolet radiation through a mask to detect a discontinuity or defect therein.

One additional feature of the invention is that visible light emanating from the holes on the second side of the module may be sensed at any angle from 5° to 90° to the module. The visible light may be best sensed at an angle from 20° to 40°.

DETAILED DESCRIPTION

Figure 1:
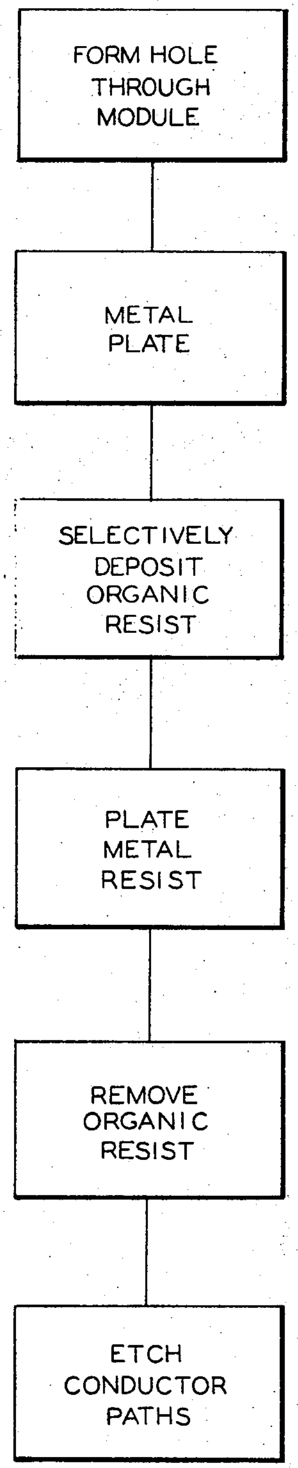
FIG. 1 is a flow chart of a process for manufacturing circuit modules with plated-through-holes.
Figure 1A:
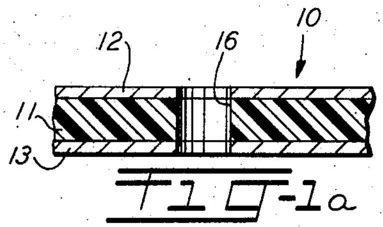
FIGS. 1*a*–1*f* is a cross section of a circuit module and the layers of material made thereon in accordance with the process for manufacturing circuit modules shown in FIG. 1.

Referring to FIG. 1a, there is shown a circuit module 10 having an insulating layer 11 with metal sheets or films 12 and 13 bonded or deposited thereon. The insulating layer 11 may be a sheet of material selected from the many materials which produce acceptable printed circuits, for example, epoxy resin impregnated glass fabric, pheno formaldehyde sheets, polyethylene glycol terephthalate film, etc., or those commonly used in thin film circuits, such as aluminum oxide and other ceramics. The insulating layer 11 has impregnated therein a fluorescent material which emits visible light when irradiated with ultraviolet radiation. One such fluorescent material, suitable for mixing epoxy resins, is a fluorescent brightening agent sold by Sandoz Colors and Chemicals, Inc. of Hanover, New Jersey, under the trade name LEUCOPHOR and identified by the number C–6901. About one-half to 2 percent of the LEUCOPHOR C–6901 was found to produce good results with the epoxy material. There are a number of fluorescent materials which would be acceptable. However, the fluorescent material selected must have the ability to withstand the temperatures and various solvents and solutions to which the insulating layer 11 is subjected to during its manufacture and during the manufacture of the circuit module.

The metal sheets 12 and 13 are bonded to the insulating layer 11 by conventional techniques. For printed circuits, the sheets 12 and 13 may be copper sheets which have a oxide formed on the side facing the insulating layer 11 to improve the bond strength thereto. For example, the copper sheets 12 and 13 are laminated to a semi-cured epoxy-glass sheet therebetween in a hot press to produce a laminate to be used in making a printed circuit panel. Other examples of processes for forming the sheets 12 and 13 are vacuum deposition, sputtering, electroless deposition, etc.

After laminating the sheets 12 and 13 and the insulating layer 11, a hole 16 is formed through the module 10. The hole is to be used for making a plated-through-hole connection. It must have sufficient width to allow a plating solution to flow readily through the hole to make a sufficient conductor. For electrical currents of about 2 amperes, through an insulating layer 11 of about 0.0625 inches thick, a plated-through-hole about 0.03 to 0.06 inches in diameter and about 0.001 to 0.002 inches in thickness has been found acceptable.

Figure 1B:
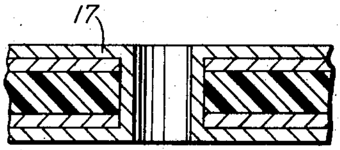
Figure 1C:
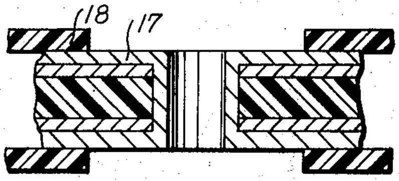
Figure 1D:
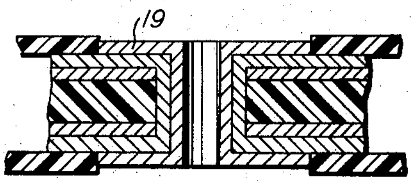
Figure 1E:
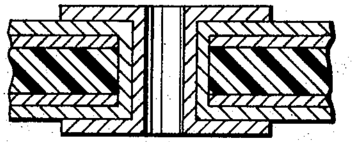
Figure 1F:
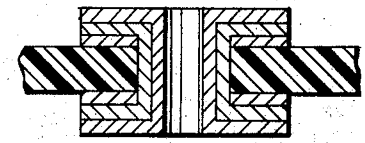

Referring to FIG. 1, after the hole 16 has been formed, the entire surface including the surface of the hole 16 of the circuit module 10 is plated with a metal layer 17 (FIG. 1b), such as copper. The process may utilize conventional steps of sensitizing, electroless plating, and electrolytic plating. Next, an organic resist material 18(FIG. 1c) is applied to selected areas of the circuit module 10 leaving exposed those areas which are to be used as conductors. Then a metal resist 19, such as solder alloy, is plated on the exposed areas. The metal resist is selected to be resistant to a selected metal etching solution, such as ammonium persulfate or chromic acid. Then the organic resist is removed (FIG. 1e) by a suitable solvent and the exposed metal not covered by the metal resist 19 is completely etched away (FIG. 1f) to leave the desired conductors and plated-through-holes.

Alternately, the step of selectively depositing an organic resist may be made before the metal plating step. Thus, metal would only be plated on those areas to be used on the circuit module 10 as conductors.

Figure 2:
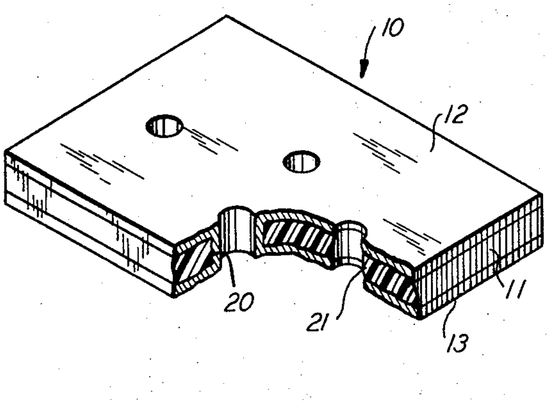
FIG. 2 is an isometric view of a circuit module having plated-through-holes therein and particularly illustrating one hole having not been properly plated.

Referring to FIG. 2, there is shown the module 10 after it has completed the metal plating step (FIG. 1b). a hole 20 in the module 10 has been plated with metal while the hole 21 has failed to be plated. The failure to plate in the hole 21 may have been caused by some extraneous material plugging the hole 21, improper sensitization of the hole 21, or an irregularity in the insulating material 11 in the position of the hole 21.

Figure 3:
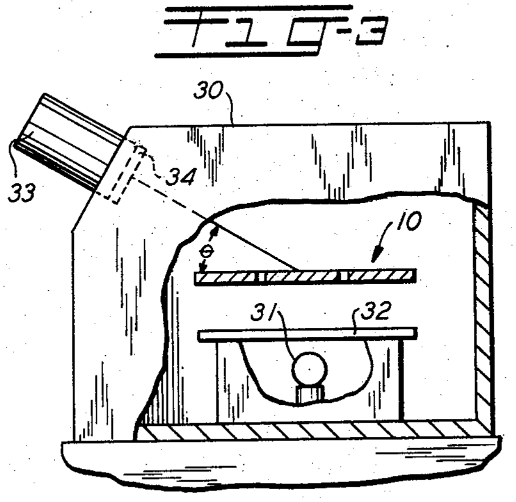
FIG. 3 shows an apparatus for inspecting the module of FIG. 2 in accordance with the invention herein.

Referring to FIG. 3, there is shown a light tight inspection apparatus 30 having suitable facilities for receiving the circuit module 10. The apparatus 30 has one or more ultraviolet lamps 31 covered by a blue filter 32 which is positioned below a circuit module 10 received by the apparatus 30. The lamp 31 is of the type which generates near ultraviolet radiation or radiation peaking at about 375 nanometers. This type of lamp may produce some visible blue light so the filter 32 is used to filter out substantially all the visible light. A viewing port 33 is positioned on the apparatus 30 at an angle $\theta$ to the top of a circuit module 10 received in the apparatus 30. The viewing port 33 preferably has an ultraviolet filter 34 thereon to prevent injury to the operator inspecting the circuit module 10. If any of the holes in the module 10 have even a minor flaw therein, it has been found that the fluorescent material in the insulating layer 11 (FIG. 2) readily emits visible light which can be readily seen by the operator at a quick glance. Either diffusion, defraction or reflection of the ultraviolet radiation in the plated-through-holes causes any exposed insulation therein to flouresce. Thus, the operator may readily inspect a large circuit module in a relatively short time for flaws in plated-through-holes therein without having to tediously scrutinize each individual hole.

The angle $\theta$ at which the module 10 is observed from above may vary from about 5° to 90°. The best results are obtained when viewed at from an angle in the range of about 20° to 40°. For angles of viewing generally less than about 70°, it may be desirable to rotate the module 10 in its plane by 180° as some light emissions may be more readily seen when so rotated.

Figure 4:
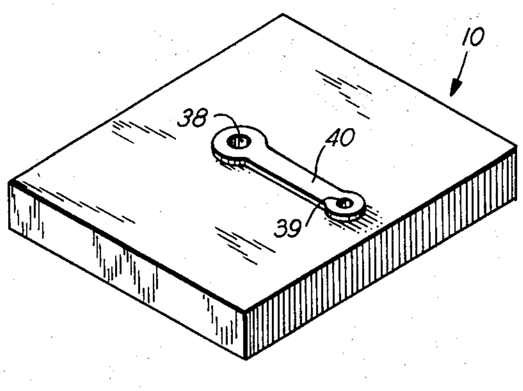
FIG. 4 is an isometric view of another module having conductor paths formed thereon.
Figure 5:
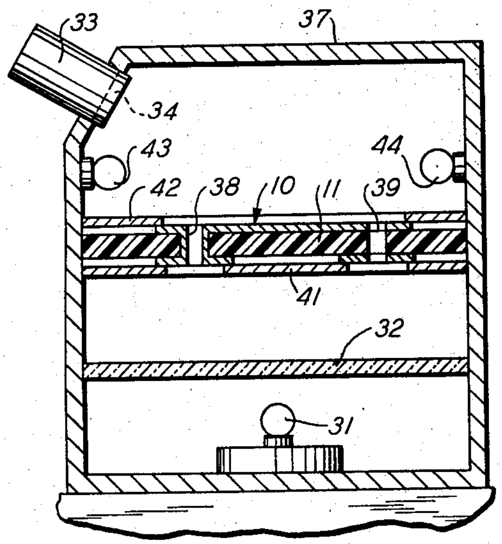
FIG. 5 shows an alternate apparatus for inspecting the circuit pattern in accordance with the invention herein.

Referring to FIG. 5, there is shown an alternate light tight apparatus 37 for inspecting a circuit module 10 such as that shown in FIG. 4 which has a conductor 40 formed thereon with plated-through-holes 38 and 39. The apparatus employs the same ultraviolet lamp 31, blue filter 32, view port 33 and ultraviolet filter 34 as shown in FIG. 3. A mask 41 covers the exposed surfaces of insulation 11 on the bottom of the module 10 while leaving uncovered the holes 38 and 39. The openings in the mask 41 need only be slightly bigger than the holes 38 and 39. Thus, the exposed surfaces of insulation do not fluoresce and produce visible light which may make it difficult for an operator to detect flaws in the plated-through-holes.

Also, the apparatus 37 has a mask 42 covering the exposed surfaces of insulation 11 on the top of the module 10. The mask 42 leaves uncovered the openings 38 and 39 and also substantially most of the conductor 40. Ultraviolet lamps 43 and 44 irradiate the exposed surfaces on the top of the module 10. Thus, any discontinuity, pinhole, or defect in the conductor 40 can be readily detected by the operator. It has also been found that for epoxy-resin insulation having a single top layer of copper thereon, irradiating the insulation from below will show any pinholes in the layer of copper.

The above-described embodiments of the invention are simply illustrative of the principals of the invention. Many embodiments may be devised without departing from the scope and spirit of the invention. For example, a system of visible light sensitive units or photocells may be employed to sense light emanating from the top of the module 10 and the openings of the plated-through-holes therein.

What is claimed is:

1. A process of inspecting plated-through-holes in a circuit module wherein the insulating layer in the circuit module has impregnated therein a fluorescent material which produces visible light when irradiated with ultraviolet radiation, comprising:

irradiating the circuit module on a first side with ultraviolet radiation; and sensing visible light emanating from the second side of the circuit module at an angle between 5° and 90° to the circuit module to determine if any plated-through-holes in the circuit module have flaws therein.

2. A process as defined in claim 1 wherein the first side has conductors formed thereon and the exposed surfaces of the insulating layer on the first side are masked to prevent visible light from being produced by the exposed insulating layer.

3. A process as defined in claim 1 wherein the visible light emanating from the second side of the circuit module is sensed at an angle between 20° and 40° to the circuit module to determine if any plated-through-holes in the circuit module have flaws therein.

4. A process as defined in claim 2 wherein the second side has conductors formed thereon and which includes:

masking the exposed surfaces of the insulating layer on the second side to expose only the conductors;

irradiating the second side with ultraviolet radiation; and sensing visible light emanating from the second side of the circuit module at an angle between 5° and 90° to the circuit module to determine if any conductors on the second side or any plated-through-holes in the circuit module have flaws therein.

* * * * *